United States Patent
Myhill

(10) Patent No.: US 9,808,896 B2
(45) Date of Patent: Nov. 7, 2017

(54) POSITIVE FEED TOOL WITH A MODULAR ARCHITECTURE

(71) Applicant: Apex Brands, Inc., Apex, NC (US)

(72) Inventor: Kevin Myhill, Lexington, SC (US)

(73) Assignee: Apex Brands, Inc., Apex, NC (US)

( * ) Notice: Subject to any disclaimer, the term of this patent is extended or adjusted under 35 U.S.C. 154(b) by 610 days.

(21) Appl. No.: 14/188,201

(22) Filed: Feb. 24, 2014

(65) Prior Publication Data

US 2014/0238711 A1  Aug. 28, 2014

Related U.S. Application Data

(60) Provisional application No. 61/769,736, filed on Feb. 26, 2013, provisional application No. 61/822,959, filed on May 14, 2013.

(51) Int. Cl.

| | |
|---|---|
| B23Q 5/26 | (2006.01) |
| B23Q 5/32 | (2006.01) |
| B23Q 11/04 | (2006.01) |
| B25B 21/00 | (2006.01) |
| B25F 3/00 | (2006.01) |
| B25F 5/00 | (2006.01) |
| B25F 5/02 | (2006.01) |
| F16K 1/34 | (2006.01) |
| F16K 27/02 | (2006.01) |
| F16K 31/122 | (2006.01) |

(52) U.S. Cl.
CPC ............ *B23Q 5/326* (2013.01); *B23Q 5/261* (2013.01); *B23Q 5/263* (2013.01); *B23Q 5/265* (2013.01); *B23Q 11/04* (2013.01); *B25B 21/00* (2013.01); *B25F 3/00* (2013.01); *B25F 5/00* (2013.01); *B25F 5/001* (2013.01); *B25F 5/02* (2013.01); *F16K 1/34* (2013.01); *F16K 27/02* (2013.01); *F16K 31/1225* (2013.01)

(58) Field of Classification Search
CPC ................................ B23Q 5/263; B23Q 11/00
USPC ....................................................... 408/6, 14
See application file for complete search history.

(56) References Cited

U.S. PATENT DOCUMENTS

| | | | |
|---|---|---|---|
| 1,312,644 A | 8/1919 | Raab et al. | |
| 2,893,272 A | 7/1959 | Linsker | |
| 3,411,385 A | 11/1968 | Quackenbush | |
| 3,577,807 A | 5/1971 | Alexander et al. | |
| 3,590,582 A * | 7/1971 | German | B25B 23/145 137/624.14 |
| 3,802,792 A | 4/1974 | Quackenbush | |

(Continued)

FOREIGN PATENT DOCUMENTS

| | | |
|---|---|---|
| CN | 1154902 A | 7/1997 |
| CN | 1452704 A | 10/2003 |

(Continued)

*Primary Examiner* — Thanh Truong
*Assistant Examiner* — Patrick Fry
(74) *Attorney, Agent, or Firm* — Coats & Bennett, PLLC

(57) ABSTRACT

Positive feed tools that include gear heads configured to be driven by a motor. The gear heads further include a pneumatic manifold that provides for access to input/output signals to add on additional components that include additional air logic functionality. The gear head includes first and second interface positions. Each interface is configured to receive either the motor for powering the gear head or an add-on component to provide additional functionality to the tool.

14 Claims, 16 Drawing Sheets

(56) References Cited

U.S. PATENT DOCUMENTS

| | | | |
|---|---|---|---|
| 4,308,892 | A | 1/1982 | Van Ausdal |
| 4,443,139 | A | 4/1984 | Eash |
| 4,473,329 | A * | 9/1984 | Aoshima ............ B23Q 11/04 408/11 |
| 4,642,098 | A | 2/1987 | Lundquist |
| 4,702,650 | A * | 10/1987 | Golwas ............. B23Q 17/09 377/15 |
| 4,782,726 | A | 11/1988 | Ryder et al. |
| 4,850,753 | A | 7/1989 | Dudden |
| 4,936,052 | A | 6/1990 | Nagase et al. |
| 5,027,978 | A | 7/1991 | Roeser |
| 5,035,129 | A * | 7/1991 | Denham ............ B21J 15/28 29/243.523 |
| 5,088,903 | A | 2/1992 | Tomatsu |
| 5,149,230 | A | 9/1992 | Nett |
| 5,860,446 | A | 1/1999 | Hunt |
| 5,974,835 | A | 11/1999 | Lovell et al. |
| 6,149,356 | A | 11/2000 | Chu et al. |
| 6,162,030 | A | 12/2000 | Pierrat |
| 6,192,781 | B1 | 2/2001 | Thames et al. |
| 6,284,047 | B1 | 9/2001 | Yoshida et al. |
| 6,402,442 | B2 * | 6/2002 | Akamatsu ........... G05B 19/4065 409/134 |
| 6,421,895 | B2 | 7/2002 | Muscarella et al. |
| 6,536,536 | B1 | 3/2003 | Gass et al. |
| 7,048,077 | B2 * | 5/2006 | Veres ............. B23Q 5/326 173/145 |
| 7,270,194 | B2 * | 9/2007 | Veres ............. B23Q 5/326 173/145 |
| 7,400,106 | B2 | 7/2008 | DeCicco et al. |
| 7,798,751 | B2 | 9/2010 | Krause |
| 7,806,637 | B2 | 10/2010 | Oehninger et al. |
| 8,033,343 | B2 | 10/2011 | Barrows et al. |
| 8,353,361 | B2 | 1/2013 | Suzuki et al. |
| 8,469,641 | B2 | 6/2013 | Jaillon |
| 8,522,941 | B1 | 9/2013 | Eldessouky |
| 9,120,160 | B1 | 9/2015 | Eldessouky et al. |
| 2002/0030327 | A1 | 3/2002 | Florence et al. |
| 2003/0078475 | A1 | 4/2003 | Hirata et al. |
| 2003/0196824 | A1 | 10/2003 | Gass et al. |
| 2005/0279517 | A1 | 12/2005 | Hoffman et al. |
| 2006/0018724 | A1 | 1/2006 | Oehninger et al. |
| 2007/0039303 | A1 | 2/2007 | Mitchell, Jr. |
| 2008/0260485 | A1 | 10/2008 | Jaillon et al. |
| 2012/0045328 | A1 | 2/2012 | Rashidi |
| 2012/0209243 | A1 | 8/2012 | Yan |
| 2014/0352524 | A1 | 12/2014 | Mullen |
| 2016/0146366 | A1 | 5/2016 | Takahashi et al. |

FOREIGN PATENT DOCUMENTS

| | | |
|---|---|---|
| EP | 0060186 A2 | 9/1982 |
| EP | 0929704 B1 | 10/2001 |
| EP | 1618978 A1 | 1/2006 |
| EP | 1916045 A1 | 4/2008 |
| FR | 2881366 A1 | 8/2006 |
| GB | 2195164 A | 3/1988 |
| WO | 0078502 A2 | 12/2000 |
| WO | 0105559 A2 | 1/2001 |

* cited by examiner

POSITIVE FEED TOOL WITH A MODULAR ARCHITECTURE

CROSS-REFERENCE TO RELATED APPLICATIONS

The present application claims benefit of U.S. Application No. 61/769,736 filed on Feb. 26, 2013 entitled Feed Drill and U.S. Application No. 61/822,959 filed on May 14, 2013 entitled Feed Drill, both of which applications are incorporated herein by reference in their entirety.

BACKGROUND

Positive feed tools, such as but not limited to feed drills and screwdrivers, are conventionally known for performing operations on workpieces formed of substances such as steel, aluminum, titanium, and composites. Positive feed tools include a tool feed mechanism that feeds a bit into a work piece. Conventional applications for positive feed tools include, among other applications, drilling holes in various parts of aircraft.

Positive feed tools generally include an air, hydraulic, or electric motor that drives gears in a gear head to move a spindle. The tools also include an air logic system that controls a variety of different control functions, such as motor start, tool advance, tool retract, and motor stop. Air logic systems are particularly common in tools that include pneumatic pistons. The air for the air logic system may be supplied by a compressor or storage tank such as an air cylinder.

When a tool is being designed, it is desirable to position handles/buttons such that they are easy for the operator to access and use. However due to the variation in tool fixture positioning and operator preference it is difficult to provide a universally acceptable solution. Requests to provide custom solutions when the standard functionality and buttons do not meet requirements are common. To accommodate the need for a tool to have different configurations and controls for different uses, tools may be configured for attachment of additional components that require additional air logic to operate. Examples include but are not limited to handles with a variety of tool operation switches for motor control, pneumatic operated clamping devices for attachment to a tooling plate or workpiece, a counter, and a lubricator.

Existing tool designs are problematic in accommodating both the need to mount components in different configurations and also to use the tool air logic system. Access to the tool air logic system is often difficult and typically results in the tool being cumbersome due to the add-on component. Existing tools are either not equipped to facilitate the additional components and/or the process is difficult and time-consuming.

SUMMARY

The present application improves the ability to add on components such as attachments and accessories to a positive feed tool by providing a standard manifold interface with necessary signals for additional logic functions. The manifold could be sealed on a standard tool but available for the addition of add-on components. The manifold may include one or more ports to control one or more tool features. The features may include but are not limited to supply of air to external valves, one or more safety interlocks, remote start, remote retract, tool cycle completion, tool running and tool in retract.

One embodiment is directed to a gear head for a positive feed tool that is configured for engagement with a motor and an add-on component. The gear head includes a spindle having an elongated shape and configured to move in advance and retract directions along a feed path, a plurality of gears configured to be driven to rotate the spindle and move the spindle along the feed path, an air manifold, and first and second manifold interfaces each in communication with the air manifold and including a common number and arrangement of ports to receive either the motor or the add-on component.

The first manifold interface may be aligned perpendicular to the second manifold interface.

The gear head may further include a separate input spaced away from each of the first and second manifold interfaces to receive air from an outside source with the input being in communication with the air manifold.

The plurality of gears may be operated based on signals received through one of the first and second manifold interfaces.

The gear head may include logic to control motor start, spindle advance, spindle retract, and motor stop.

The first and second manifold interfaces may be configured to receive signals to operate a pneumatic clamp.

The first and second manifold interfaces may be configured to receive signals to activate a counter.

The first and second manifold interfaces may be configured to receive signals to operate a pneumatic clamp.

Another embodiment is directed to a method of operating a positive feed tool. The method includes aligning a motor interface of a motor that includes a first port arrangement with a first manifold interface on a gear head that includes a second port arrangement and attaching the motor to the gear head at the first manifold interface. The method includes aligning a component interface of a component that includes a third port arrangement with a second manifold interface on the gear head that includes a fourth port arrangement and attaching the component to the gear head at the second manifold interface. Each of the first, second, third, and fourth port arrangements include the same number of ports and the same layout of the ports. The method further includes activating the motor and driving a spindle in the gear head along a feed path. The method includes activating an input on the component and controlling the spindle.

The method may further include detaching each of the motor and the component from the gear head and subsequently aligning the first port arrangement of the motor interface with the second manifold interface on the gear head and attaching the motor to the gear head at the second manifold interface.

The method may further include detaching each of the motor and the component from the gear head and subsequently aligning the third port arrangement of the component interface with the first manifold interface on the gear head and attaching the component to the gear head at the first manifold interface.

The method may further include attaching the motor and the component to the gear head with the motor positioned at an angle that is perpendicular to the component.

The method may further include providing air signals to both the motor and the component through air stored in a common interface in the gear head.

The method may further include removing one of the motor and the component from the gear head and attaching a cover across the exposed manifold interface.

The various aspects of the various embodiments may be used alone or in any combination, as is desired.

DETAILED DESCRIPTION

The present application is directed to positive feed tools with gear heads that include a pneumatic manifold that provides for access to input/output signals to add on additional components that include additional air logic functionality. The gear head includes first and second interface positions. Each interface is configured to receive either a motor for powering the gear head or an add-on component to provide additional functionality to the tool.

Figure 1:
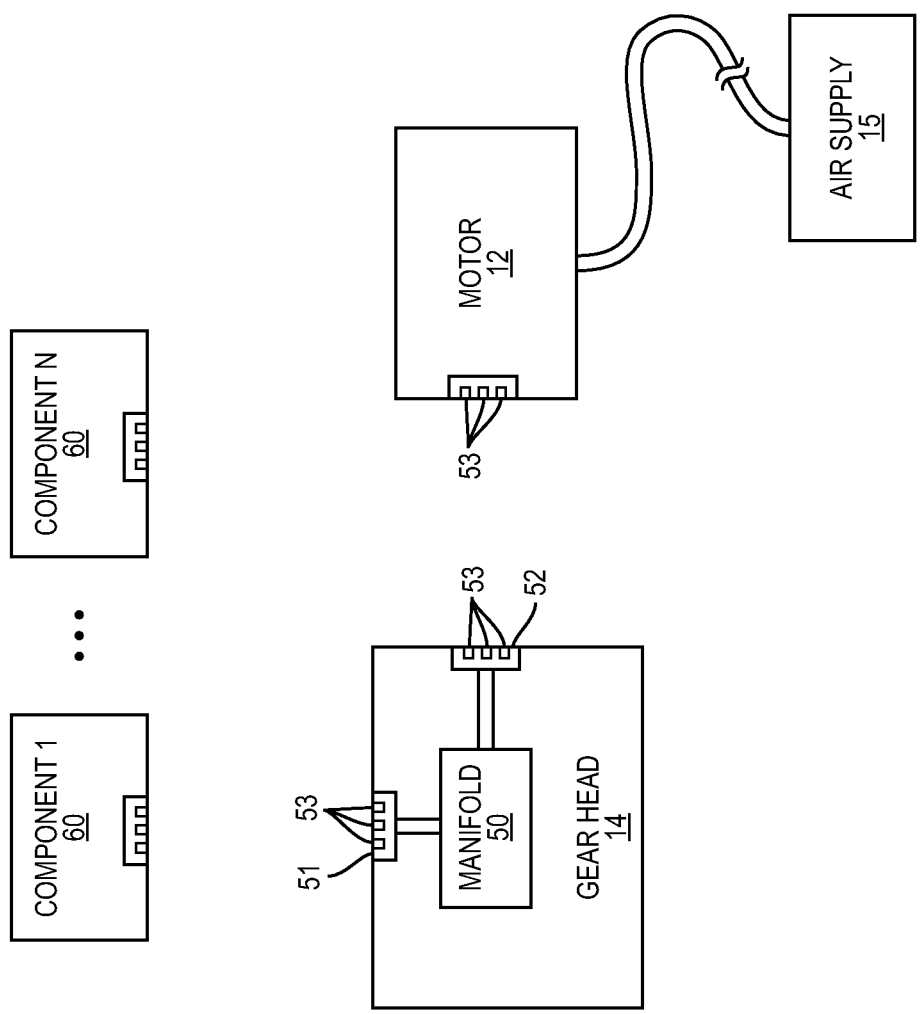
FIG. 1 is a schematic exploded view of a gear head with first and second manifold interfaces to receive a motor and one component.

FIG. 1 schematically illustrates one or more embodiments of a tool 10 that includes a gear head 14, an air motor 12 powered through an air supply 15, and one or more add-on components 60. The gear head 14 includes a common air manifold 50 that communicate with first and second manifold interfaces 51, 52. Each manifold interface 51, 52 include a common arrangement of ports 53 for attachment of either the motor 12 or one of the components 60. The ports 53 provide for air to be supplied through the motor 12 to the manifold 50. The ports 53 also provide for a range of input/output signals that can be used to operate the components 60. This architecture provides for adjustability of the overall tool 10 to conform to the needs of the operation. In one or more embodiments that include an air motor 12, the air supply 15 provides the air source. In one or more embodiments that do not use an air motor 12 (e.g., hydraulic motor 12, electric motor 12), the motor 12 is configured to provide air through the air supply 15.

Figure 2:
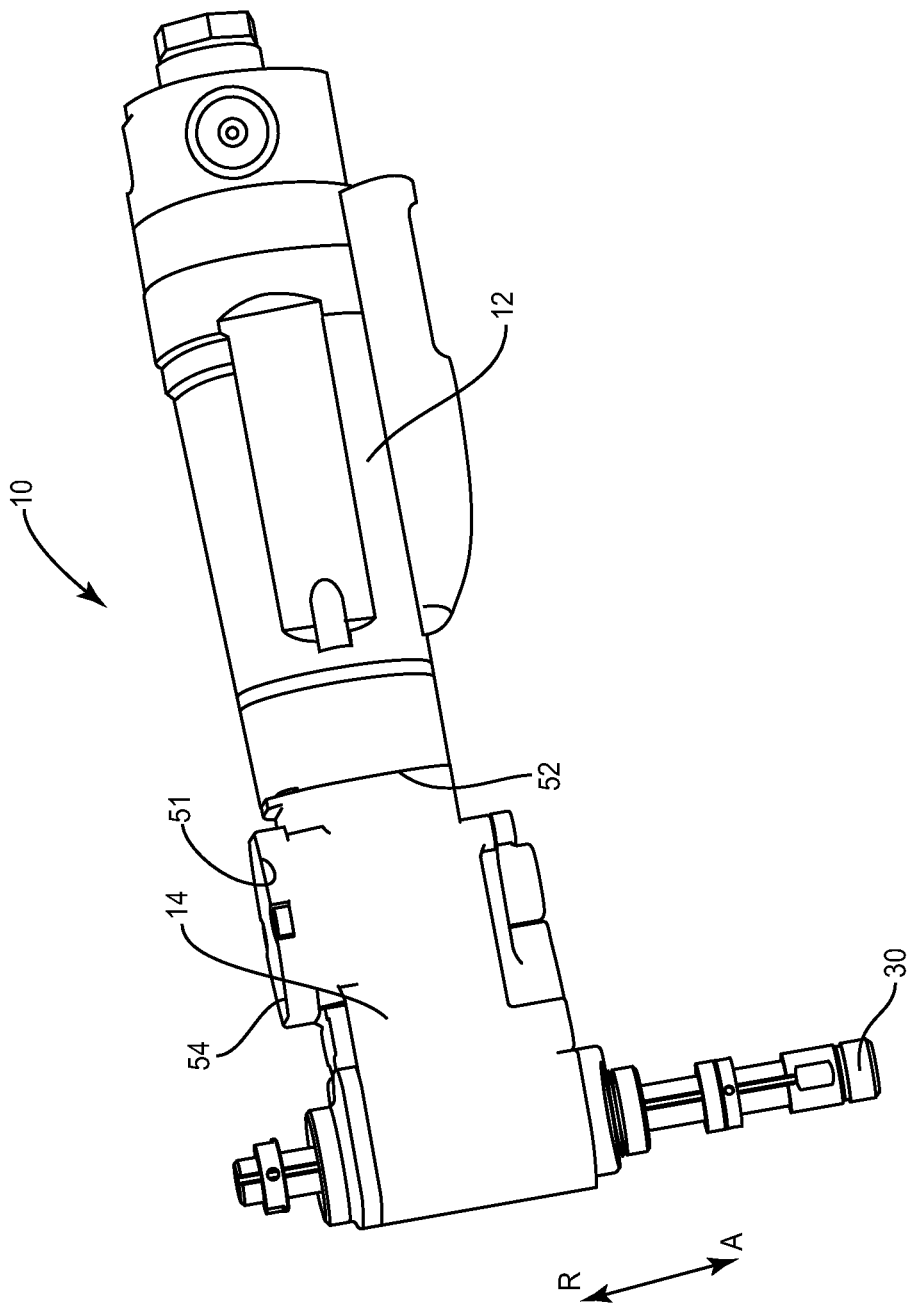
FIG. 2 is a perspective view of a right-angle tool.
Figure 3:
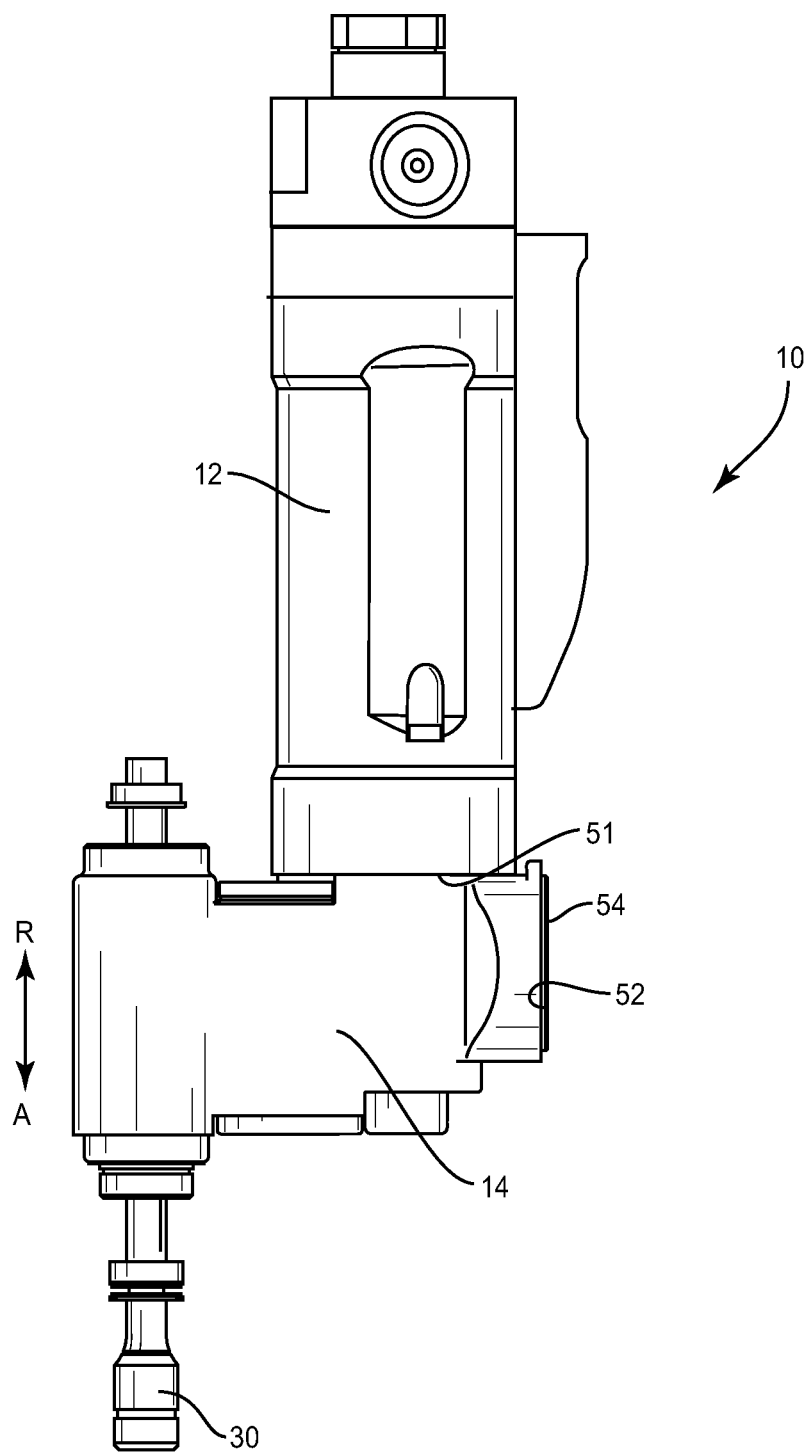
FIG. 3 is a perspective view of an in-line tool.

FIGS. 2 and 3 are built on this architecture. FIG. 2 includes a right-angle tool with the motor 12 aligned perpendicular to the axis of a spindle 30 of the gear head 14. The motor 12 is connected to the second manifold 52 with the first manifold 51 being available to accommodate one of the components 60 (not illustrated in FIG. 2). FIG. 3 includes an in-line tool 10 with the motor 12 aligned with the axis of the spindle 30. The motor 12 in this architecture is connected to the manifold 51 with the other manifold 52 being available for addition of a component 60 (not illustrated in FIG. 3).

In the various embodiments, one of the manifold interfaces 51, 52 may remain unused by an add-on component 60. In these instances, the unused manifold 51, 52 may be sealed by a cover 54.

The gear head 14 includes a number of gears that are driven by the motor 12. The gears act to rotate and axially move the spindle 30 along a feed path in both an advance direction A and a retract direction R. The motor 12 and gear head 14 are configured to provide a force to the gears to operate the spindle 30.

Figure 4:
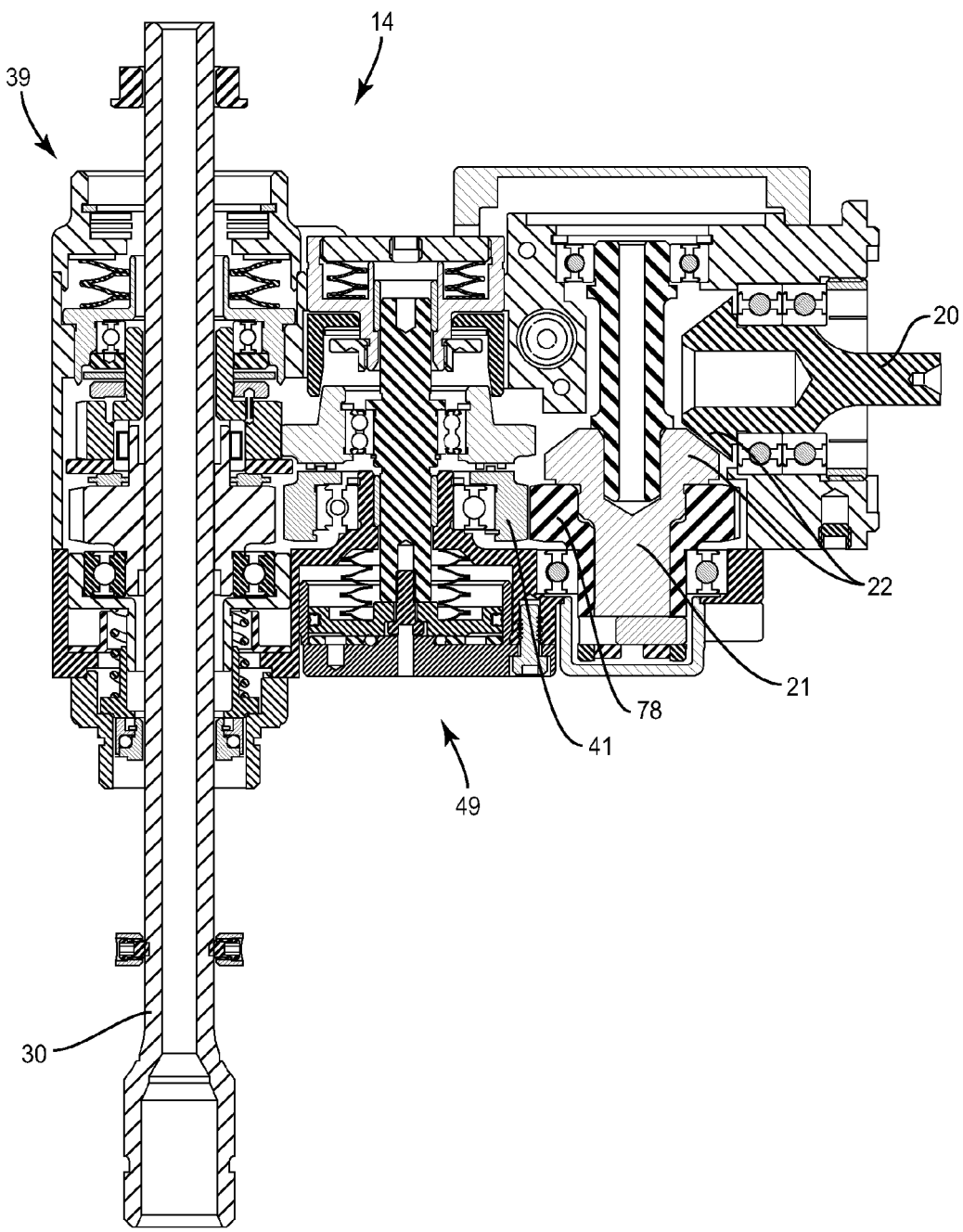
FIG. 4 is a side sectional view of a gear head.

FIG. 4 illustrates a side schematic view of a right angle feed gear head 14 separated from the motor 12 (not illustrated in FIG. 4). The gear head 14 includes an input shaft 20 that is driven by the motor 12. A set of bevel gears 22 is employed to provide rotation to an input gear 21. A gear 78 is connected to the input gear 21 and is operatively connected to a differential unit 49 which in turn drives a spindle unit 39 that includes the spindle 30. A similar configuration is used for an inline tool with the input gear 21 being driven directly by the motor 12. For both a right angle gear head 14 and inline gear head 14, the spindle unit 39 and differential unit 49 are substantially the same.

Figure 5:
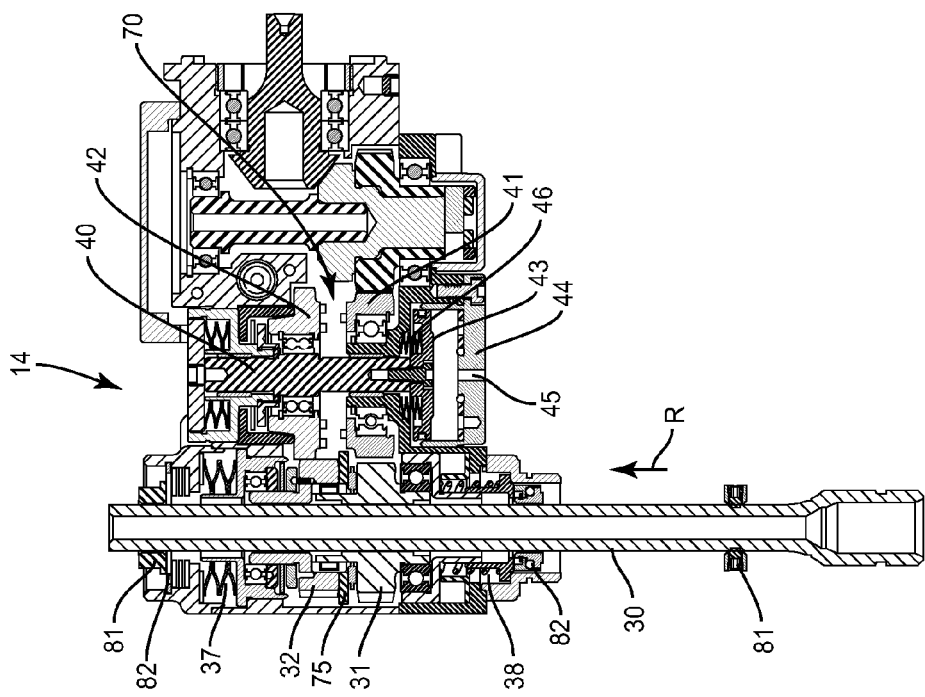
FIG. 5 is a side sectional view of a gear head in a forward feed operation.
Figure 6:
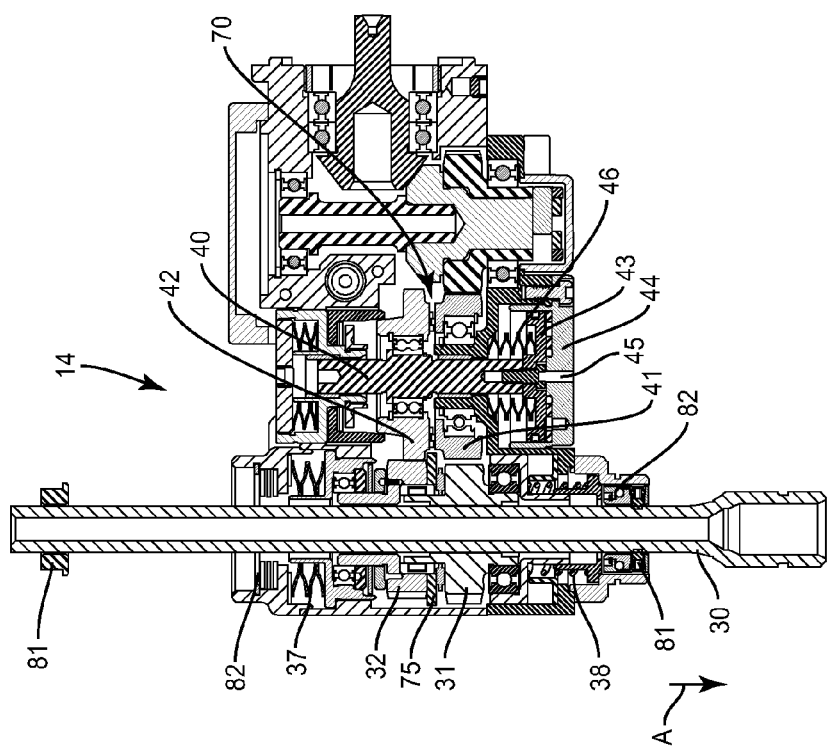
FIG. 6 is a side sectional view of a gear head in a retract operation.

As illustrated in FIGS. 5 and 6, the differential unit 49 is powered through the motor 12 and engages with and drives the spindle unit 39. The spindle unit 39 includes one or more of the spindle 30, spindle drive gear 31, and a spindle feed gear 32. The differential unit 49 includes one or more of the differential drive gear 41, differential feed gear 42, and a feed shaft 40. The units 39, 49 are generally aligned with the spindle 30 being parallel to the feed shaft 40.

The spindle 30 is an elongated member that includes one or more slots for engagement with the drive gear 31 and threads for engagement with the feed gear 32. A distal end of the spindle 30 is configured to receive a tool bit for performing operations on the workpiece. One or more stop members 81 may be attached to the spindle 30 to control an extent of axial movement of the spindle 30 in the advance and retract directions. The stops 81 are attached to the spindle 30 and move axially with the spindle 30. In one or more embodiments, the stops 81 are collars that are threaded onto the spindle 30. The stops 81 extend radially outward from the spindle 30 and are sized to contact against a respective contact member 82 to prevent additional axial movement of the spindle 30. To prevent damage, one or both of the contact members 82 may include a bearing at the point at which the spindle 30 can no longer be driven forward.

In one embodiment as illustrated in FIGS. 5 and 6, the spindle 30 includes two stops 81. A first stop 81 is positioned along a proximal section of the spindle 30 to control an extent of movement in the forward direction. The stop 81 contacts against a contact member 82 at a top of the gear head 14 to prevent additional axial movement in the forward direction. A second stop 81 is positioned along a distal section of the spindle 30 to control an extent of reverse movement. This stop 81 contacts against a contact member 82 at a lower portion of the gear head 14.

The drive gear 31 and feed gear 32 each include an annular shape with a central opening to receive the spindle 30. The spindle feed gear 32 includes internal threads that are threaded onto external threads that extend along the length of the spindle 30. Hence, when the spindle feed gear 32 is rotated in relation to the spindle 30, the spindle 30 will feed in the advance direction through the spindle feed gear 32. In one or more embodiments, external threads of the spindle 30 are left-handed threads. The spindle 30 also includes slots that extend along its length. The spindle drive gear 31 includes internal male splines that engage with the drive grooves on the spindle 30. Thus, when the spindle drive gear 31 is rotated, the spindle 30 also rotates. Teeth extend around the outer periphery of each gear 31, 32 to engage with corresponding teeth in the gears of the differential unit 49. A biasing member 38 is positioned to force the spindle feed gear 32 towards the spindle drive gear 31.

In the differential unit 49, each of the drive gear 41 and feed gear 42 extend around the feed shaft 40 and include teeth around their periphery to respectively engage with the corresponding gears 31, 32 of the spindle unit 39. The axial differential feed gear 42 is attached to the feed shaft 40 and axially moves with the feed shaft 40. The differential drive gear 41 extends around the feed shaft 40 but does not axially move with the feed shaft 40 (i.e., the feed shaft 40 slides through a central opening in the differential drive gear 41).

A piston 43 is attached to the feed shaft 40 and axially moves with the feed shaft 40. The piston 43 is positioned within the interior of a cylinder 44 and is sized to extend across the cylinder 44. An inlet 45 is positioned at a bottom of the cylinder 44. The inlet 45 is sized to include a smaller area than the cross-sectional size of the cylinder 44. A biasing member 46 extends along the feed shaft 40 between the piston 43 and the differential drive gear 41. The biasing member 46 biases the piston 43 towards the inlet 45.

The differential drive gear 41 is driven through the motor 12. Differential drive gear 41 engages with drive gear 31 which is operatively connected to the spindle 30 to thereby provide rotation to the spindle 30. The differential drive gear 41 is also operatively connected to and rotates the differential feed gear 42. The differential feed gear 42 engages with the spindle feed gear 32 which is threaded onto the spindle 30. The feed gears 32, 42 provide for the spindle 30 to move in the advance and retract directions with the rate and direction of feed based on ratios between the drive gear 41/drive gear 31 and the feed gear 42/feed gear 32. In one or more embodiments, the thread on the spindle 30 is made left hand such that feed in the advance direction is achieved by rotating the spindle feed gear 32 faster than the spindle drive gear 31.

To move the spindle 30 in the retract direction the differential feed gear 42 is disengaged from the differential drive gear 41. As the differential feed gear 42 is not otherwise driven, the differential feed gear 42 becomes stationary. Because the feed gear 32 is driven through the feed gear 42, the spindle feed gear 32 also becomes stationary. With the spindle 30 still being driven by the spindle drive gear 31 (through the differential drive gear 41), the spindle 30 is caused to retract due to the threads along the length of the spindle 30 that are engaged in the now stationary spindle feed gear 32.

The tool 10 may include various manners of disengaging the differential feed gear 42 from the differential drive gear 41. The disengagement includes that the differential feed gear 42 and differential drive gear 41 move axially apart. This may include one or more of a torque overload clutch 70 between the differential feed gear 42 and the differential drive gear 41, a mechanical lift ring 75 that moves the differential feed gear 42, and a two-stage piston 43. In one or more embodiments, the tool 10 includes each of these aspects. Other embodiments include the feed tool 10 having just a single one of these aspects. Still other embodiments may include the feed tool 10 having two or more of these aspects. In one specific embodiment, the tool 10 includes a lift ring 75 and a two-stage piston 43. In another specific embodiment, the tool 10 includes a torque overload clutch 70 and a two-stage piston 43.

The torque overload clutch 70 is one manner to shift the tool 10 between forward and retract operations. The clutch 70 includes matching ramps 85 on the contact faces of the differential drive gear 41 and differential feed gear 42. The ramps 85 mate together for the drive gear 41 to rotate the feed gear 42. The force of the biasing member 46 maintains engagement between the ramps 85 on the opposing gears 41, 42.

Figure 7:
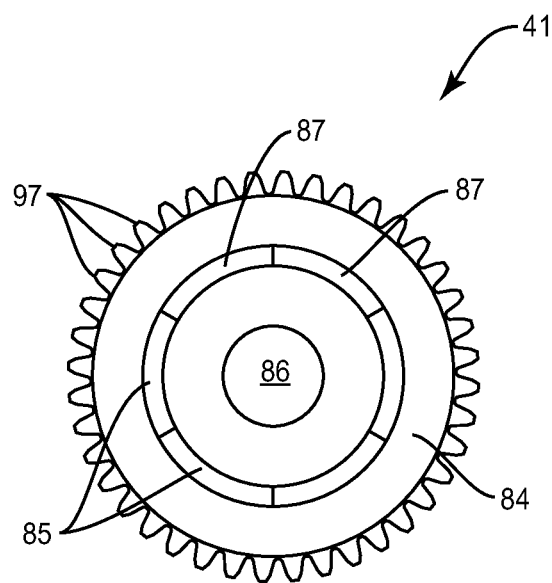
FIG. 7 is a top view of a differential drive gear with ramps that form a portion of a threshold clutch.
Figure 7A:
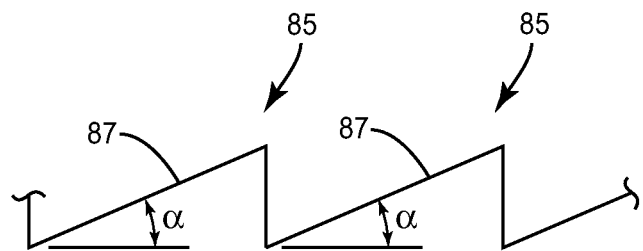
FIG. 7A is a side view of two of the ramps of FIG. 7.

FIG. 7 illustrates a top view of the differential drive gear 41 that includes a circular cross sectional shape. A central opening 86 is sized to receive the feed shaft 40. The axial face 84 that faces towards the differential feed gear 42 includes ramps 85 that each includes a sloped cam face 87 as best illustrated in FIG. 7A. The cam faces 87 are aligned at an angle $\alpha$ with the axial face 84. The angle $\alpha$ may vary depending upon the extent of necessary engagement. In one or more embodiments, the ramps 85 extend completely around the central opening 86. Other embodiments may include different numbers and configurations of ramps 85. The differential feed gear 42 includes a similar configuration with corresponding ramps 85 that mate together. The ramps 85 on the opposing gears 42, 41 may include the same or different angles $\alpha$.

Figure 8:
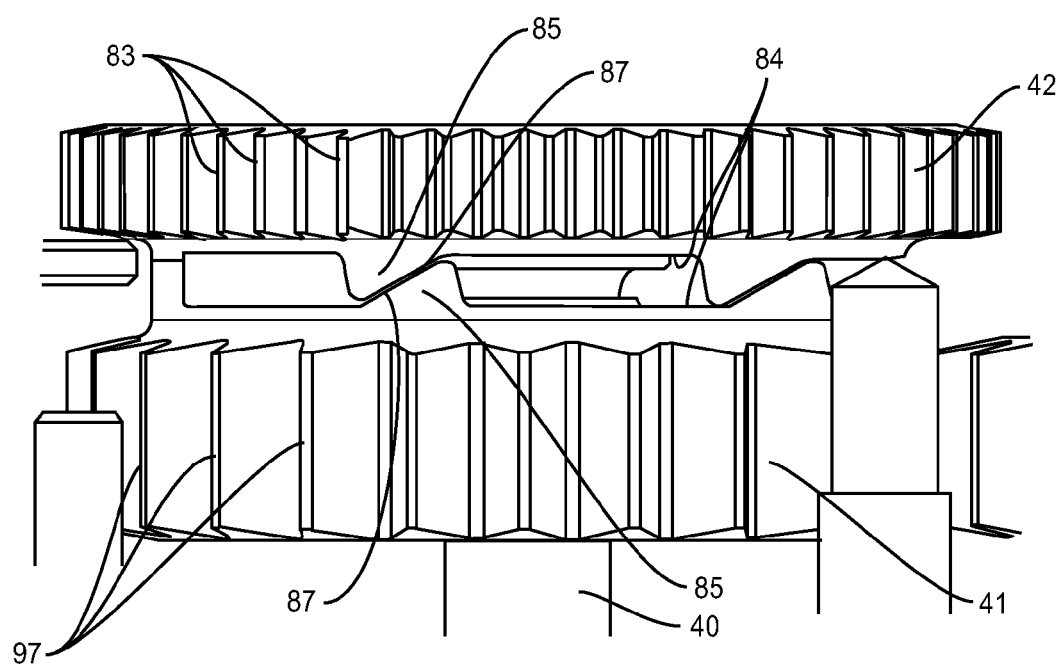
FIG. 8 is a side perspective view of a threshold clutch formed between a differential drive gear and a differential feed gear.

FIG. 8 illustrates the differential drive gear 41 and feed gear 42 mated together, such as when the tool 10 is operating in the advance direction. The cam faces 87 of the opposing ramps 85 contact together for the drive gear 41 to rotate the feed gear 42. The drive gear 41 also includes the gear teeth 97 along the periphery that engage with corresponding teeth on the spindle drive gear 31. Likewise, the feed gear 42 includes peripheral gear teeth 83 that engage with teeth on the spindle feed gear 32. The ramps 85 are held in contact at least by the biasing force applied to the gears 41, 42 by the biasing member 46. In the event that the differential feed gear 42 cannot be driven, then the two gears 41, 42 will separate along the axis of the differential feed shaft 40. The amount of torque for overload to cause the separation is a function of the force applied by the biasing member 46 and the angle $\alpha$ of the cam faces 87.

When the tool 10 is operating in the forward direction as illustrated in FIG. 5, the differential feed gear 42 is coupled to the differential drive gear 41 through the clutch 70 that includes the matching ramps 85 that are held in contact by the bias force of the biasing member 46. The spindle feed gear 32 rotates at a differential speed relative to the spindle drive gear 31 hence causing the spindle 30 to advance. At the extent of movement of the spindle 30 in the advance direction, additional movement of the spindle 30 is stopped through the upper depth stop member 81 contacting against the contact member 82. At the contact between the depth stop 81 and the contact member 82, the drive to the spindle feed gear 32 is still occurring from the differential feed gear 42 (through the differential drive gear 41). As the spindle 30 is prevented from moving axially forward but is still being rotated through the spindle drive gear 31, the spindle feed gear 32 that is threaded onto the spindle 30 moves axially backwards along the spindle 30. This movement causes the spindle feed gear 32 to move against the biasing member 37. This structure is developed for "thrust overload" and is of particular advantage for tools that are used for countersinking where a small dwell period at the end of the spindle stroke is greatly advantageous for accurate countersink depth and maintaining a clean finish on the countersink form.

In one or more embodiments, the biasing member 37 includes one or more Belleville washers, wave springs, magnets, and compression springs. The member 37 has a preload approximately equal to the thrust rating of the gear head 14. The backward movement of the spindle feed gear 32 along the spindle 30 causes the gear 32 to move against the biasing member 37. This results in additional torque being needed through the differential feed gear 42 to rotate the spindle feed gear 32. This additional torque in return requires additional torque to be supplied by the differential drive gear 41. The additional torque required between the differential drive and feed gears 41, 42 causes the cam faces 87 to slide against each other and for the gears 41, 42 to axially separate and to disengage. The disengagement causes the differential feed gear 42 and thus the spindle feed gear 32 to each become stationary. The rotation of the spindle 30 through the stationary feed gear 32 results in the spindle 30 to begin to move in the retract direction.

In another embodiment, or in combination with the clutch 70, the spindle feed gear 32 includes a lift ring 75. As illustrated in FIGS. 5 and 6, the ring 75 extends radially outwardly beyond the teeth of the spindle feed gear 32 and under the differential feed gear 42. When the spindle 30 is moving in the forward direction, the lift ring 75 extends below the bottom axial face of the differential feed gear 42. At the end of stroke or thrust overload condition the spindle feed gear 32 moves backward as described above. As the spindle feed gear 32 moves axially along the spindle 30, the lift ring 75 acts on the differential feed gear 42 and moves the gear 42 away from the differential drive gear 41.

In one or more embodiments, the lift ring 75 may be attached to the spindle feed gear 32. The lift ring 75 and feed gear 32 may be formed as an integral part, such as being molded together as a single, unitary construction. The lift ring 75 may also be attached to the underside of the feed gear 32 through one or more mechanical fasteners and/or adhesives. The lift ring 75 may also be a separate element that is held in contact against the underside of the feed gear 32 by a biasing member 38.

Figure 9B:
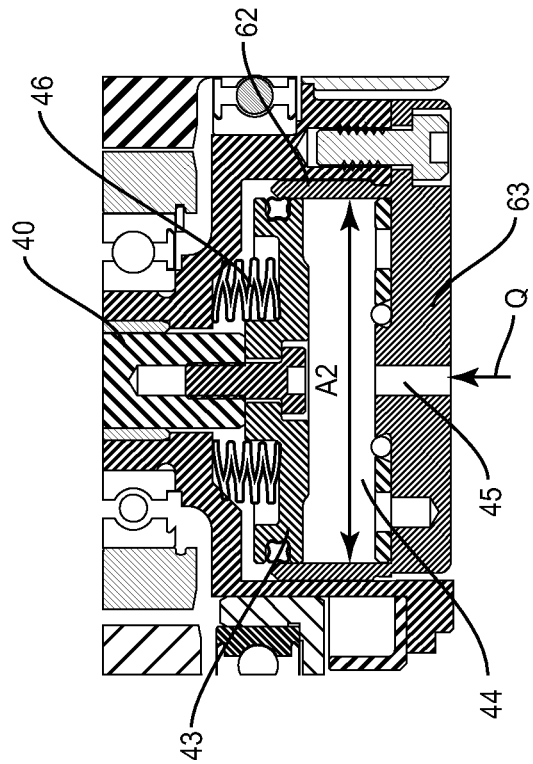
FIG. 9B is a side sectional view of a piston in a second position spaced away from the inlet with the tool in a retract operation.
Figure 9A:
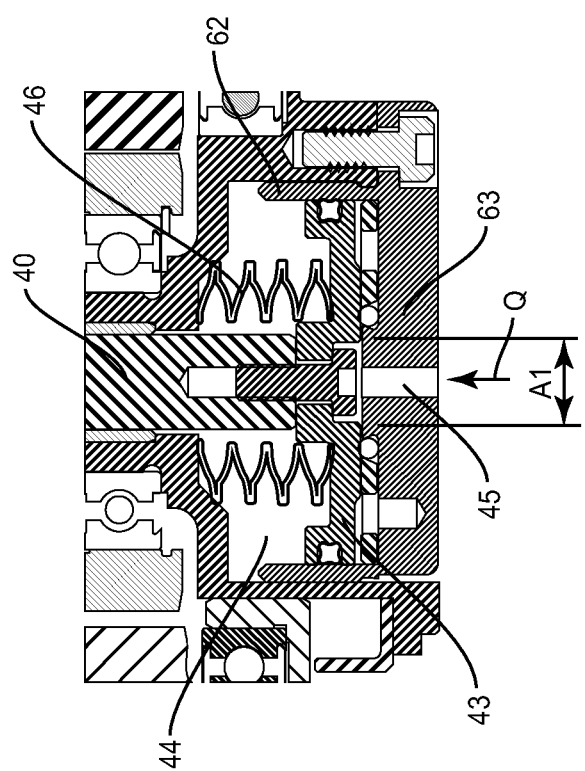
FIG. 9A is a side sectional view of a piston in a first position across an inlet with the tool in a forward feed operation.

In one or more embodiments, the torque clutch 70 and/or lift ring 75 axially move the differential feed gear 42 a limited amount to disengage from the differential drive gear 41. The piston 43 may be further configured to provide additional axial movement of the differential feed gear 42. The piston 43, feed shaft 40, and differential feed gear 42 are connected together to axially move as a unit. As illustrated in FIGS. 9A and 9B, the piston 43 is positioned in the cylinder 44 that includes the outer walls 62 and a bottom wall 63. The cross-sectional shape of the cylinder 44 matches the piston 43 such that the piston 43 extends across the cylinder 44 and the piston 43 is able to move axially within the cylinder 44. The bottom wall 63 includes the inlet 45 that provides for introduced air to act on an area A1 of the piston 43 that is less than the area of the cylinder 44. Air from an air logic system is moved in the direction of arrow Q into the inlet 45.

When the tool 10 is operating in the forward direction as illustrated in FIG. 9A, the piston 43 is positioned at the bottom wall 63 and extends over the inlet 45. Thus, the air acts on just the portion of the piston 43 equal to area A1 that is exposed through the inlet 45. The force of the biasing member 46 pressing downward on the piston 43 is greater than the force exerted by the air on the reduced area A1 of the piston 43. Thus, the piston 43 (and the attached feed shaft 40 and differential feed gear 42) remain in the same axial position.

Once the movement of the differential feed gear 42 is initiated through the lift ring 75 and/or threshold clutch 70, the piston 43 also moves axially in the cylinder 44 away from the bottom wall 63 as it is coupled to the differential feed gear 42 through the differential feed shaft 40. The bottom of the piston 43 moves away from the inlet 45 thus allowing air to act on a larger area A2 of the piston 43. This results in a larger force being supplied through the air. The larger force overcomes the biasing member 46 and axially moves the piston 43 and thus also moves the differential feed gear 42 into contact with a holding mechanism. The use of air to move the piston 43 greatly reduces the time to shift the differential feed gear 42 from the forward position to the retract position. This also greatly reduces the possibility of jamming.

Returning to the architecture of the gear head 14, the gear head 14 is substantially the same in the various embodiments to accommodate various positioning of the motor 12 and the components 60. The manifold interfaces 51, 52 each lead from a common manifold 50 and each includes a common configuration. This allows easy access to input/output signals in order to add on additional circuit functionality to the air logic system. Further, each manifold interface 51, 52 include a mounting surface with one or more attachment features to physically secure the component 60 to the gear head 14. The gear head 14 may include one or more openings to receive fasteners to attach the components 60. Other attachment features may include posts and receptacles that corresponding to attachment features on the components 60.

Figure 10:
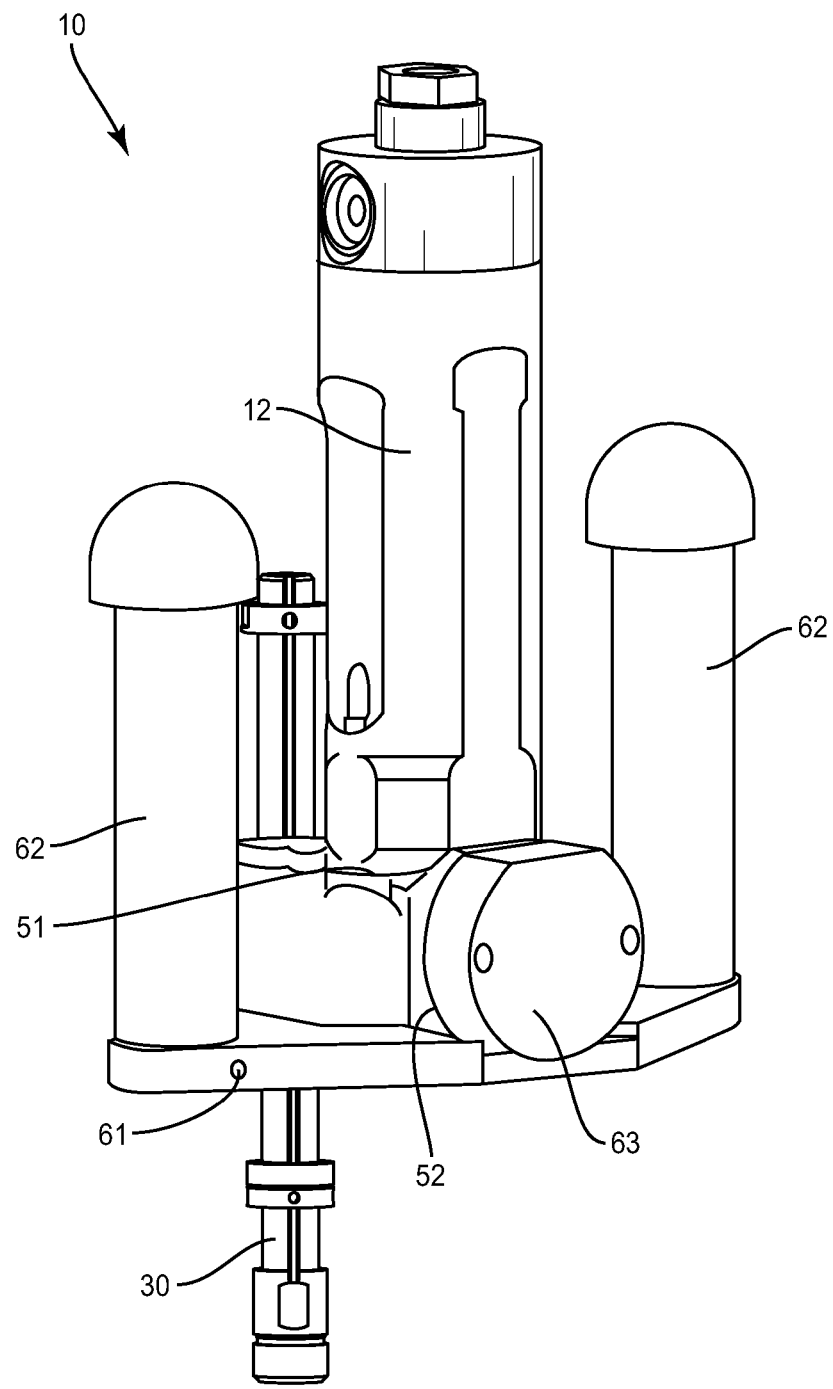
FIG. 10 is a perspective view of a tool configuration that includes a component and a motor each attached to a gear head.

Various different components 60 may be designed to be added to the gear head 14. FIG. 10 illustrates an inline tool 10 configured with a component 60 with two handles 62 that is typically used for vertical orientation applications. The component 60 includes an add-on logic manifold interface 63 attached at the second manifold interface 52. In this configuration, the motor 12 is attached at the first manifold interface 51 on the gear head 14.

Figure 11:
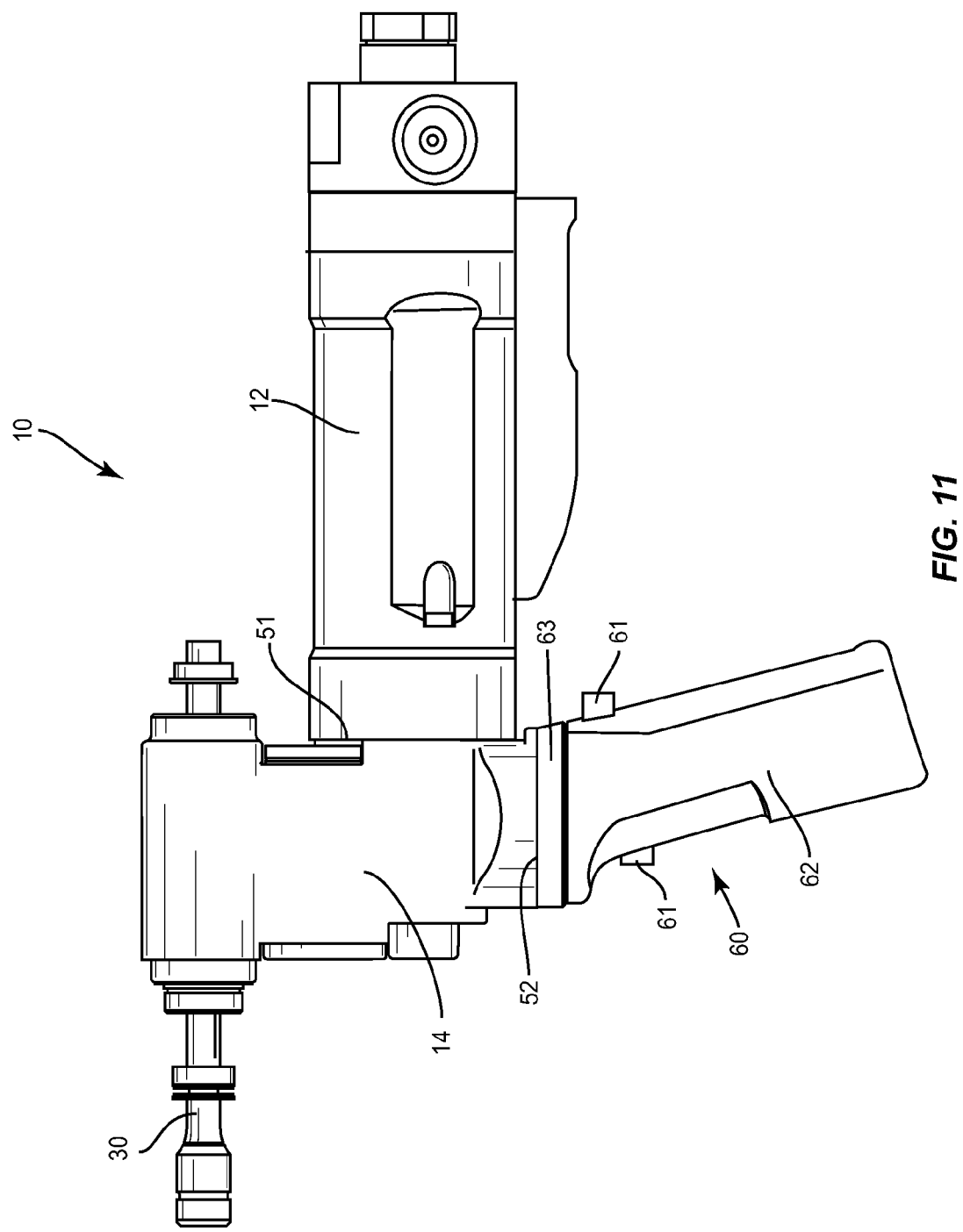
FIG. 11 is a perspective view of a tool configuration that includes a component and a motor each attached to a gear head.

FIG. 11 includes a tool 10 in an in-line configuration with a pistol handle component 60 attached at the second manifold interface 52. This component 60 includes a pistol handle 62 with a pair of inputs 61 and a manifold interface 63. This configuration is typically used for horizontal applications.

Figure 12:
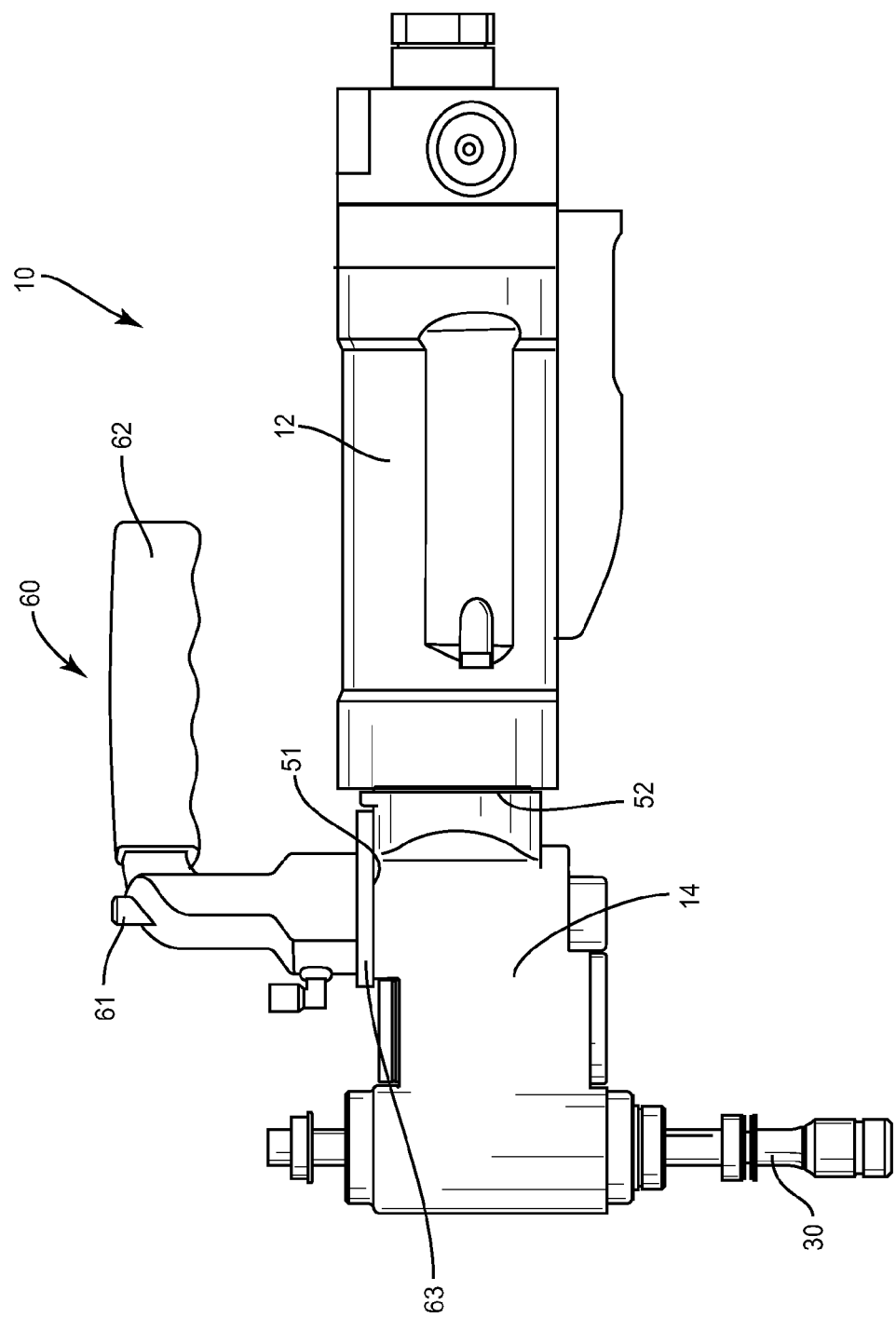
FIG. 12 is a perspective view of a tool configuration that includes a component and a motor each attached to a gear head.

FIG. 12 illustrates a tool 10 in a right-angle configuration with an add-on handle component 60 for ergonomic use mounted on the manifold 51. This can be configured for a number of options according to the available interface logic inputs and outputs. The component 60 includes the manifold interface 63 mounted at the first manifold interface 51 of the gear head 14

The various components 60 each include one or more control inputs 61 to control one or more features of the tool 10. The features may include but are not limited to tool start/stop, clamping the tool 10 to the workpiece or a fixture, safety interlocks, and manual retract of the spindle 30. The control inputs 61 may include various mechanical switches, levers, buttons, and the like that are actuated by the operator. In one or more embodiments, the operator presses or squeezes the input 61 to activate the feature, and releases the input 61 to stop the feature. The inputs 61 may be configured to remain in the activated position until the operator applies a second force.

The manifold interfaces 51, 52 may include a variety of different input/output signals that can be used for the various add on components 60. In one or more embodiments, input/output functionalities supplied on the manifolds 51, 52 include but not limited to:

RR/LO Input/Output—Input for Remote Retract/Output to signal tool is in retract (RR—Remote Retract/LO—Lube Off)

CC Output—Output that can be used to indicate the tool has completed a cycle (CC—Cycle Complete)

Main Air Output—Output of inlet pressure air that can be used to operate the clamp and/or supply air to add on valves and switches SS Input—Input of air to supply the standard start button on the tool, can be used for safety interlocking (SS—Start Supply)

S1 Output—Outputs an air signal that the start button supplied on the tool has been pressed—can be used for safety interlocking S2 Input—Input of a signal to start the tool MR Output—Outputs a signal that the tool is running/in cycle—can be used for safety interlocking tool running with clamp activation (MR—Motor Running)

One or more embodiments may include manifold interfaces 51, 52 that include ports for each of these signals. One or more other embodiments include manifold interfaces 51, 52 with fewer ports for a fewer number of these signals. One or more embodiments include manifold interfaces that include ports for the following signals: CC, SS, S1, S2, and MR.

By having these input/output signals available on the manifolds 51, 52, it is made easier to add on additional air logic functionality for the components 60. The components 60 each include a manifold interface 63 that mounts to the applicable manifold 51 or 52 and configured to correspond with these input/output functionalities.

Figure 13:
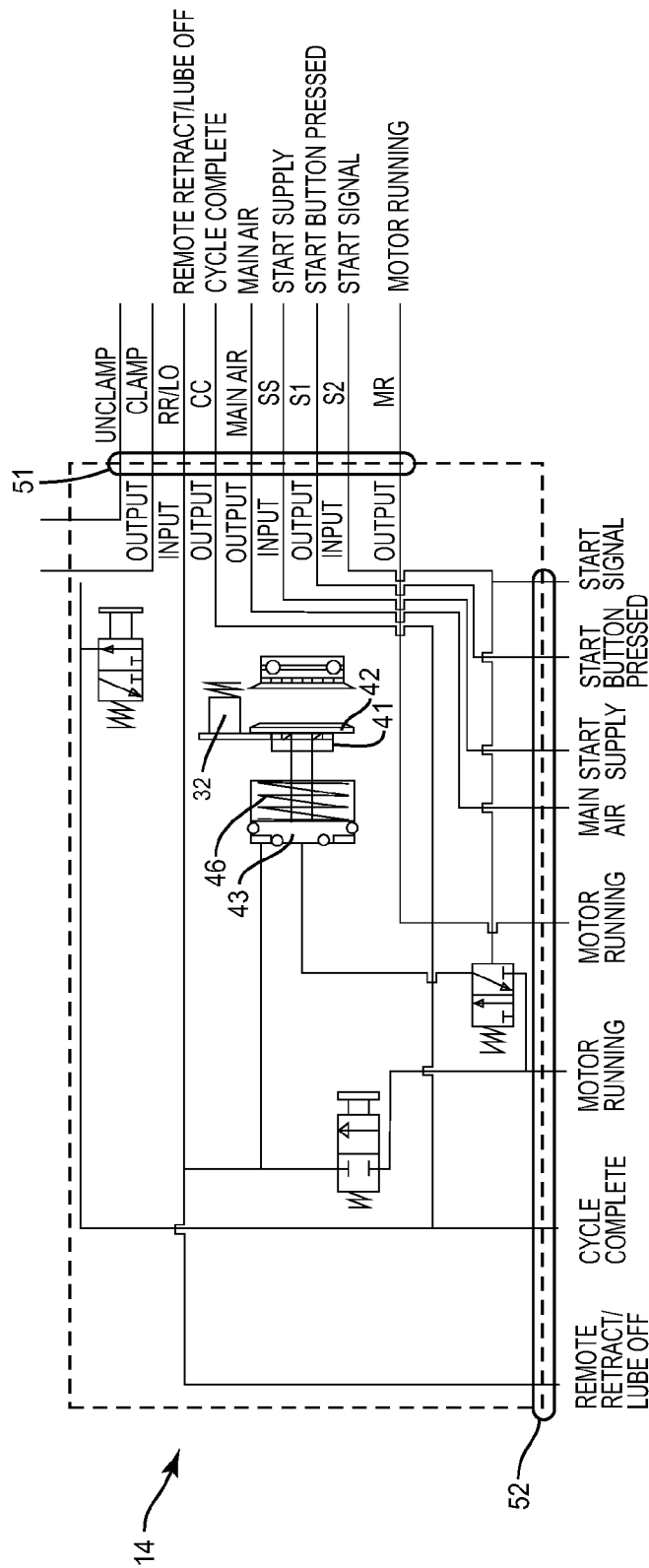
FIG. 13 is a schematic circuit diagram of a gear head.

FIG. 13 illustrates one or more embodiments of an air circuit for use with the gear head 14. The gear head 14 includes the various gears for driving the spindle 30 as explained above. Gear head 14 further includes two manifold interfaces 51, 52 each configured to receive either a motor 12 or component 60. In one or more embodiments, each manifold interface 51, 52 includes the same number and location for the ports. This provides for adjustability for the tool 10 to accommodate the particular operation. The interfaces 51, 52 include the various ports for the necessary input/output signaling. In one or more embodiments, additional ports may be provided on the manifold interfaces 51, 52 for a clamp and unclamp functionality.

Figure 14:
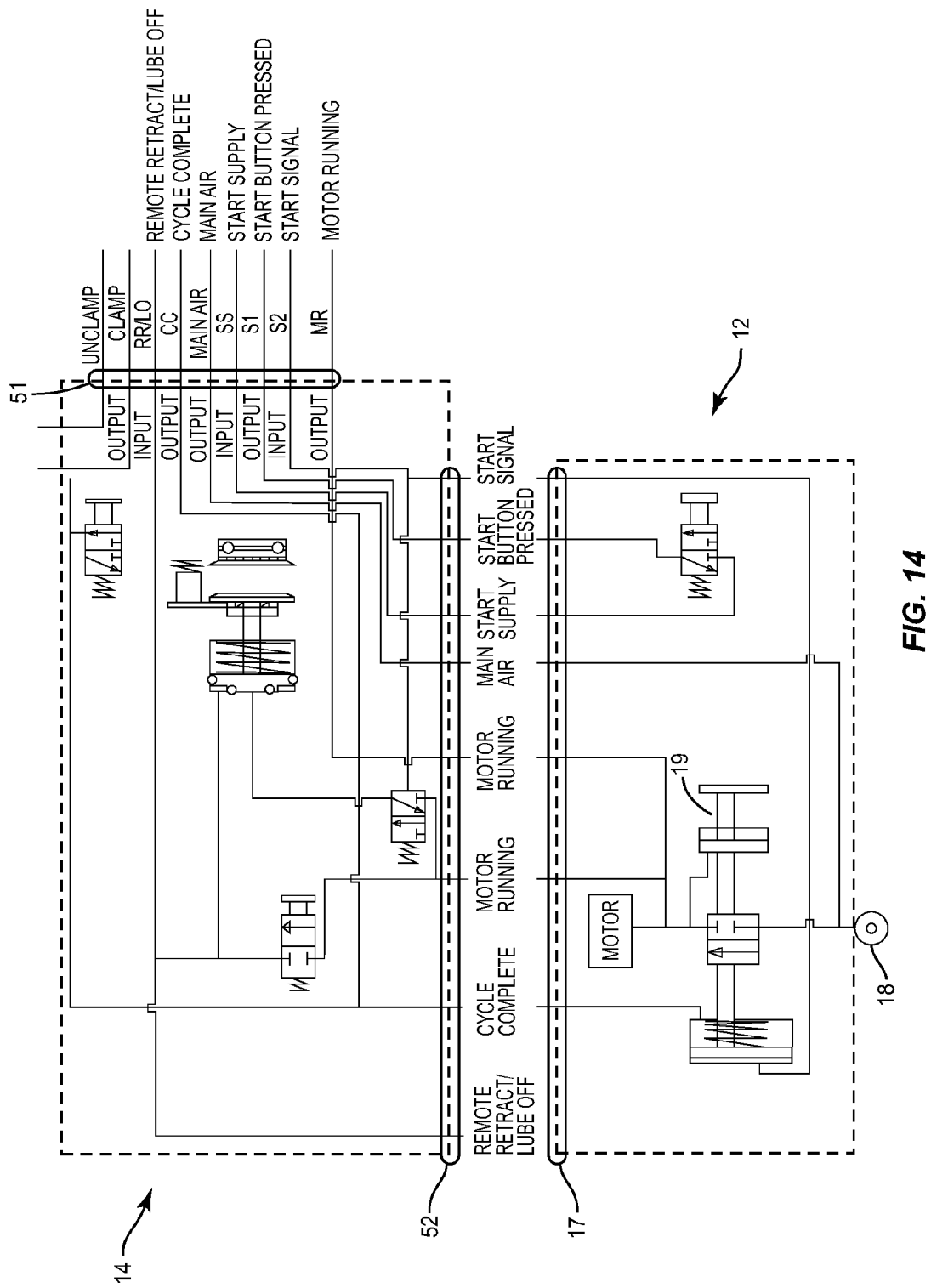
FIG. 14 is a schematic diagram of a motor configured to attach to the gear head of FIG. 13.

FIG. 14 includes a motor 12 connected at the manifold interface 52. The motor 12 includes a corresponding interface 17 configured to align and engage the manifold interface 52 to provide for the various signaling and air flow. In this embodiment, the motor 12 is powered by air and includes a main air inlet 18 that receives air from an air supply 15. Motor 12 further includes a low-pressure valve 19.

Figure 15:
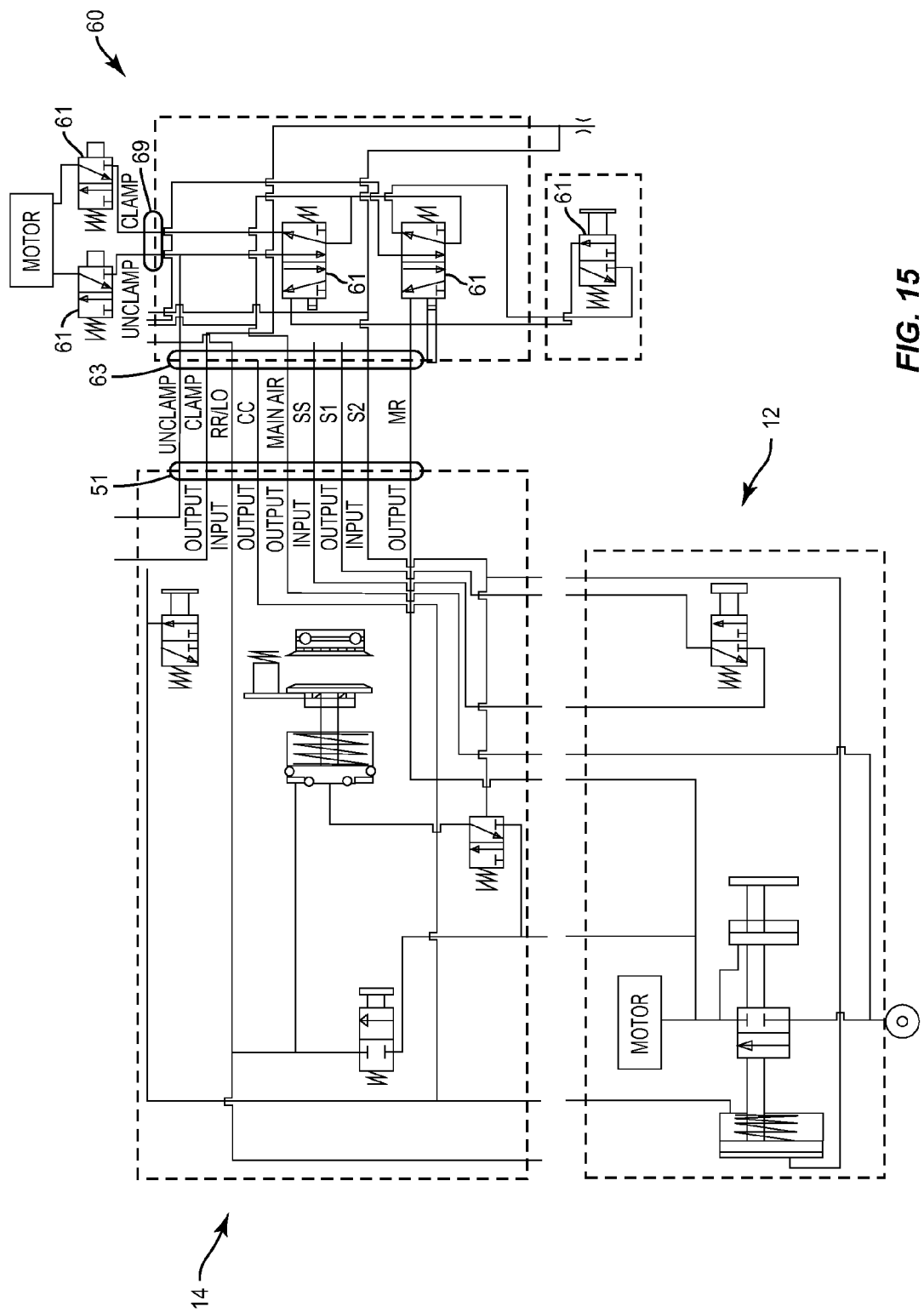
FIG. 15 is a schematic diagram of a first component configured to attach to the gear head and motor of FIG. 14.

FIG. 15 includes the gear head 14 and motor 12 of FIG. 14, with a component 60 mounted at manifold interface 51. The component 60 includes a manifold interface 63 configured to engage with the interface 51. Component 60 further includes a variety of inputs 61 to operate the component 60 and/or other features of the tool 10.

Component 60 further includes an interface 69 to engage with a clamping device that secures the tool 10 to the workpiece.

Figure 16:
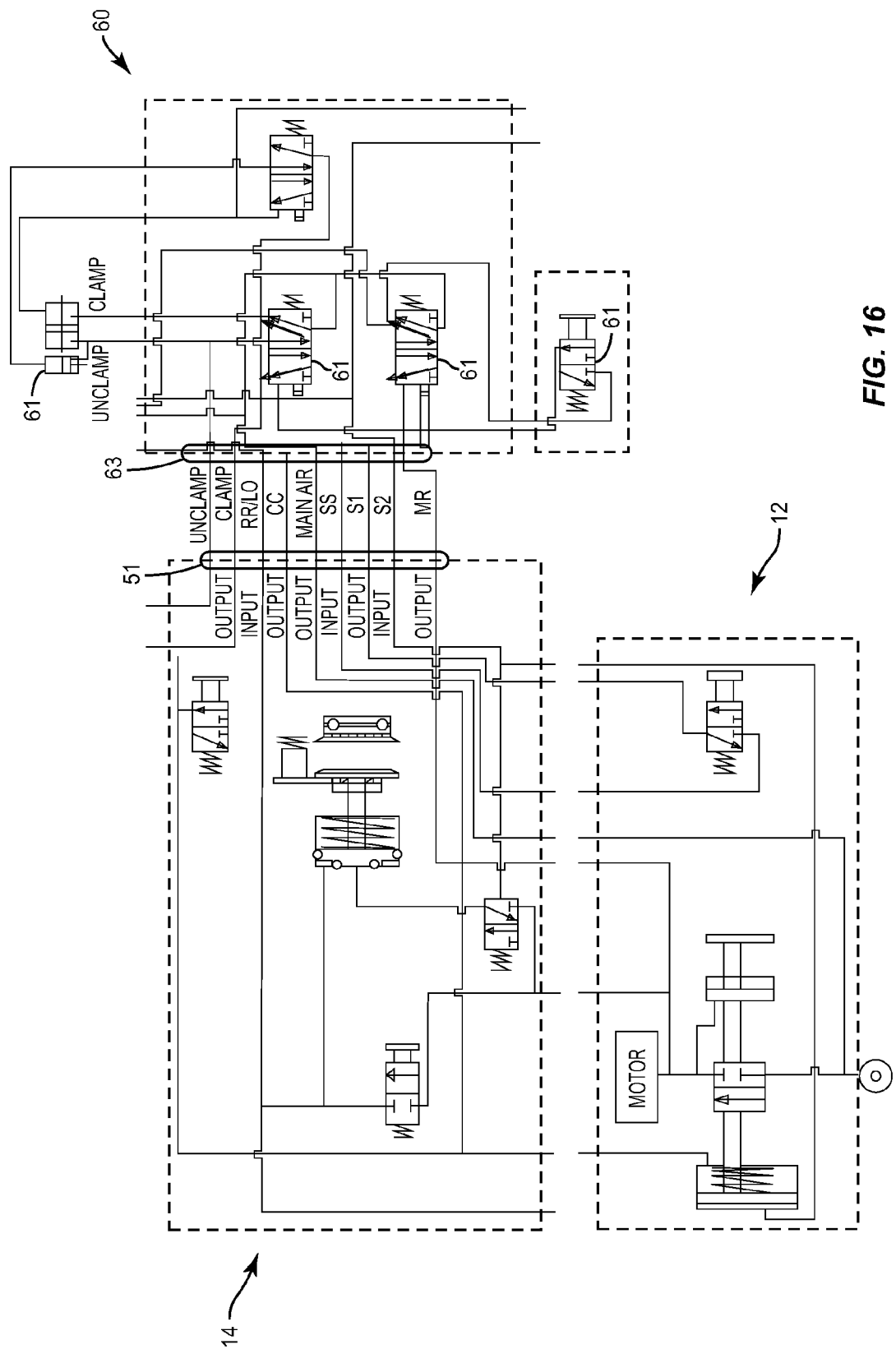
FIG. 16 is a schematic diagram of a second component configured to attach to the gear head and motor of FIG. 14.

FIG. 16 includes the gear head 14 and motor 12 of FIG. 14, with a different component 60 mounted at manifold interface 51. The component 60 includes a manifold interface 63 configured to engage with the interface 51. Component 60 further includes a variety of inputs 61 to operate the component 60 and/or other features of the tool 10. Component 60 further includes an interface 69 to engage with a clamping device that secures the tool 10 to the workpiece.

In the various air circuit diagrams, the various configurations are schematically illustrated to demonstrate the functionality. The arrangement of the ports is shown schematically in various order and with various numbers of ports. In the actual gear heads 14, motors 12, and components 60, the location and layout of the various interfaces would be the same to provide for the adjustability of the tool 10.

In use, the operator aligns the motor 12 at the desired location along the gear head 14. The motor interface 17 is aligned with one of the manifold interfaces 51, 52 on the gear head 14. The operator connects the motor to the gear head 14 such that the ports on the motor interface 17 are aligned with and match the corresponding ports on the manifold interface 51 or 52. The motor 12 may be attached through various means, including but not limited to one or more of mechanical fasteners, rails, and biased locks.

If a component 60 is not needed on the gear head 14, the operator may attach a cover over the other interface 51, 52 that is not in use. The cover seals the interface 51, 52.

If a component 60 is needed, the operator aligns the component 60 with the available interface 51, 52. The interface 63 on the component 60 is aligned with the available manifold interface 51, 52 on the gear head 14. The operator connects the component 60 to the gear head 14 such that the ports on the interface 63 are aligned with and match the corresponding ports on the manifold interface 51 or 52. The motor 12 may be attached through various means as described above for the motor 12.

The motor 12 and component 60 may be attached to the gear head 14 in different orders (i.e., the motor 12 first followed by the component 60, or the component 60 first followed by the motor 12).

In one or more embodiments, the component 60 may be removed from the gear head 14 and replaced with another component 60. This includes the operator removing the first component 60, aligning the component interface 63 on the second component 60 with the available manifold interface 51, 52, and then attaching the second component 60 as described above. The various different components 60 each include the same number and port configurations such that they may be attached to the gear head 14 as necessary.

In one or more embodiments, the operator may be able to attach the component 60 and motor 12 in a first arrangement on the gear head 14. Subsequently, the component 60 and motor 12 are removed, rearranged on the gear head 14, and reattached to the gear head 14. This provides a different tool configuration to the operator using the same combination. In one or more embodiments, the tool 10 can be reconfigured to change from a vertical orientation for vertical operations to a horizontal orientation for horizontal operations.

The differential unit 49 may include one or more biasing members to bias the differential drive gear 41 and differential feed gear 42 together. In one or more embodiments, a single biasing member is positioned at the differential drive gear 41 to provide the biasing force as illustrated in FIG. 4. In one or more embodiments, a single biasing member is positioned at the differential feed gear 42 to provide the biasing force. In one or more embodiments, two or more biasing members are positioned to apply the biasing force.

A positive feed drill uses a "differential feed" mechanism that allow rotation and feed of a spindle. The spindle rotation is driven by a gear train. The spindle drive gear has tangs drives that engage in a slot in the spindle which allow the spindle to advance while the spindle is being rotated. The advance of the spindle is achieved through a differential feed mechanism. The same differential drive gear that drives the spindle also drives a differential feed gear when feed is required. The differential feed gear then drives a spindle feed gear that is threaded onto the spindle. The rate of feed being dependent on the ratio between the Differential Drive/Spindle Drive and the Differential Feed/Spindle Feed Gears. Commonly the spindle thread is made left hand such that feed is achieved by rotating the spindle feed gear faster than the spindle drive gear. To retract the spindle the differential feed gear is disengaged from the differential feed gear and then held stationary. With the spindle still being driven by the differential drive gear the spindle now retracts. Typical methods for initiating the shift from forward to retract are mechanical cam levers, pneumatic pistons actuated by a pneumatic limit signal. When pneumatic pistons are used it is common to use pneumatic logic to provide all the control functions in the tool.

This includes motor start, tool advance, tool retract and motor stop. These tools are often used with additional equipment where additional air logic is required. Typical additional logic is to operate a pneumatic damp, activator a counter or lubricator. Of these accessories the counter can be used to monitor the number of holes on the cutter and versions of these are available that are electronic. Once a predetermined cutter count is reached the counter will either register 0 or provide a warning that the count is reach but will NOT disable the tool.

This invention seeks to improve the operation of add on counters by allowing them to stop the operation of a drill. The counter would count cycles based on the motor running signal on the air operated tool. A minimum run time would be programmed before a cycle would be registered. The counter would be preprogrammed with a warning cutter count and a maximum cutter count. When the warning cutter count is reached the counter would indicate that the cutter needs changing—either audible or visual. Once the maximum cutter count is reached the counter would disable the operation of the tool. This could be achieved as shown by interrupting the supply the tools start button. This enables the counter to be kept small by controlling the signal air to start the tool rather than the supply air.

Figure 17:
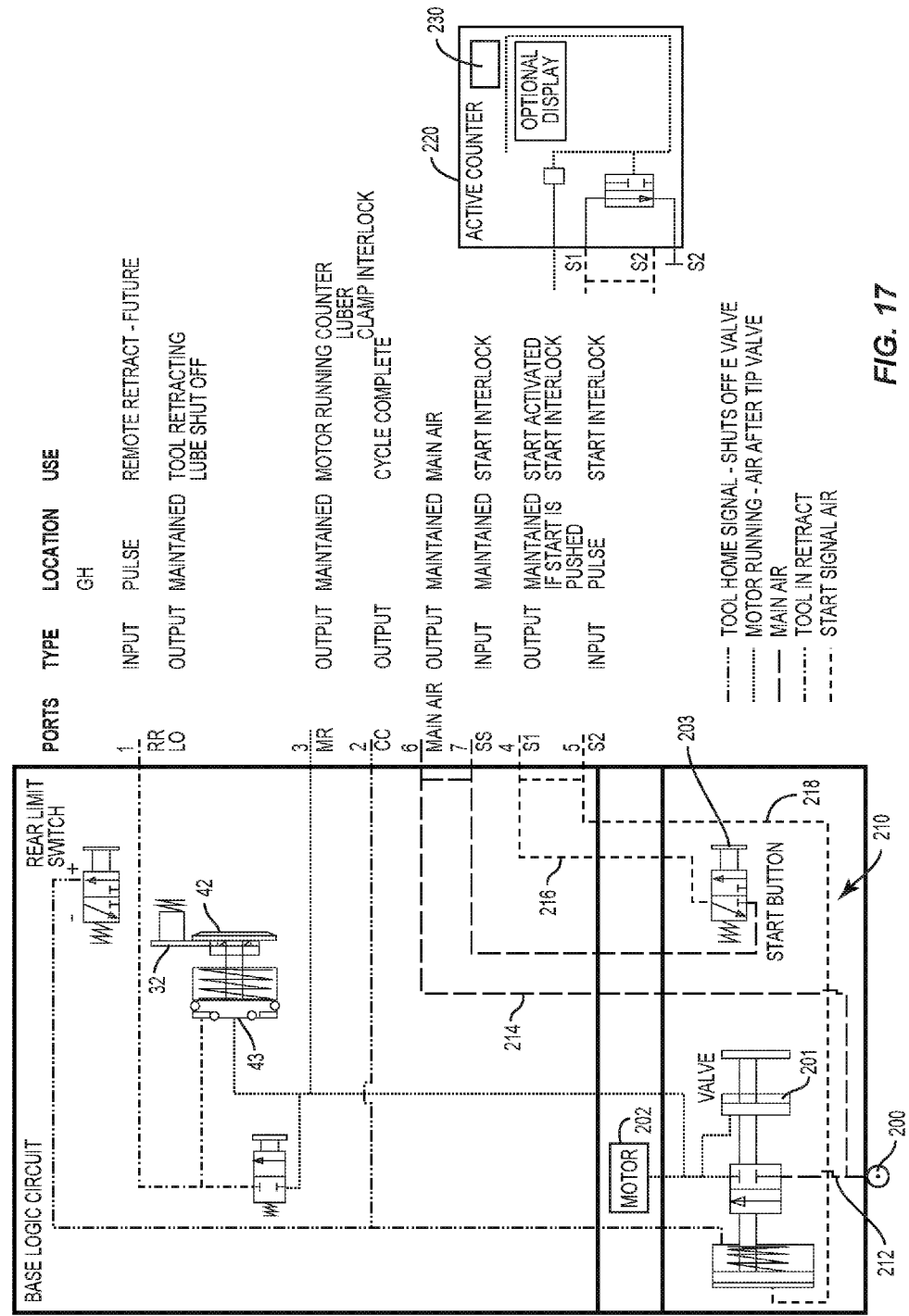
FIG. 17 is a schematic diagram of a counter configured to count cycles based on a motor running signal.

As illustrated in FIG. 17, the tool includes a main air inlet 200, a control valve 201, a motor 202, a start switch 203; and a counter 220. A pneumatic circuit 210 that include air lines extends through the tool 10. A first air line 212 extends from the inlet 200 to the motor 202. A second air line 214 extends from the first air line 212 at a point upstream from the motor 202 to the start switch 203. A third air line 216 leads from the start switch 203 to the counter 220. A fourth air line 218 leads from the counter 220 to the control valve 201. The counter 220 includes an inlet for the third air line 216, and an outlet for the fourth air line 218. The counter also includes an electronic control board 230. The control board 230 may monitor cutter cycles, maintenance cycles, and overall life cycles.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A pneumatic tool that is powered by an air supply, the pneumatic tool comprising:
    a main air inlet that receives air from the air supply;
    a pneumatic circuit that extends from the main air inlet;
    a pneumatic motor operatively connected to the pneumatic circuit;
    a spindle configured to move along a feed path in advance and retract directions;
    a plurality of gears that connect the pneumatic motor to the spindle and are configured to rotate the spindle and to move the spindle in the advance and retract directions;
    a start switch operatively connected to the pneumatic circuit to send a signal to activate the pneumatic motor;
    a counter operatively connected to the pneumatic circuit downstream from the start switch with air from the start switch passing along the pneumatic circuit to the counter, the counter comprising an inlet and an outlet for air to pass through the counter, the counter configured to count a number of times the spindle moves through a cycle;
    wherein the counter interrupts the signal from the start switch and controls the flow of air that passes through the counter and that thereby affects the air that reaches the pneumatic motor to prevent activation of the pneumatic motor when the count reaches a predetermined number, the counter configured to interrupt the signal without interrupting the flow of air into the pneumatic circuit through the main air inlet.

2. The pneumatic tool of claim 1, wherein the counter receives a motor run signal indicating that the pneumatic motor is in operation and the spindle is moving along the feed path.

3. The pneumatic tool of claim 2, wherein the counter is configured to equate receipt of the motor run signal for a predetermined period to one of the spindle cycles.

4. The pneumatic tool of claim 2, wherein the counter is configured to emit a warning upon reaching a first predetermined number of spindle cycles.

5. The pneumatic tool of claim 4, wherein the counter is configured to disable operation of the pneumatic tool upon reaching a second higher predetermined number of spindle cycles.

6. The pneumatic tool of claim 4, further comprising a control valve operatively connected to the pneumatic circuit between the main air inlet and the pneumatic motor.

7. A pneumatic tool that is powered by an air supply, the pneumatic tool comprising:
- a pneumatic motor;
- a spindle configured to move along a feed path in advance and retract directions;
- gears that connect the pneumatic motor to the spindle and are configured to rotate the spindle and to move the spindle in the advance and retract directions;
- a start input to control activation of the pneumatic motor;
- a control valve to control a flow of air to the pneumatic motor;
- a counter configured to count a number of times the spindle moves through a cycle; and
- a pneumatic circuit comprising:
  - a main air inlet that receives air from the air supply;
  - a first air line that leads from the main air inlet to the motor;
  - a second air line that leads from the first air line upstream from the motor to the start input;
  - a third air line that leads from the start input to the counter; and
  - a fourth air line that leads from the counter to the control valve, the fourth air line being separate from the third air line;
- the control valve is positioned along the first air, line between the main air inlet and the pneumatic motor;
- the counter positioned downstream from the start input such that air from the start input that moves along the third air line reaches the counter, the counter configured to control the air that moves through the counter and the fourth air line to the control valve when the counter reaches a predetermined number to disable the air supplied to the pneumatic motor through the first air line.

8. The pneumatic tool of claim 7, wherein main air inlet continues to receive air when the control valve disables the air supplied to the pneumatic motor through the first air line.

9. The pneumatic tool of claim 7, wherein the counter comprises an electronic control board that maintains a record of the counter, a warning cutter count, and a maximum cutter count.

10. A pneumatic tool that is powered by an air supply, the pneumatic tool comprising:
- a main air inlet that receives air from the air supply;
- a pneumatic circuit that extends downstream from the main air inlet;
- a pneumatic motor operatively connected to the pneumatic circuit and configured to move a spindle in cycles along a feed path;
- a start switch with a button, the start switch being operatively connected to the pneumatic circuit to send a signal through the pneumatic circuit to activate the pneumatic motor;
- a control valve operatively connected to the pneumatic circuit between the main air inlet and the pneumatic motor;
- a counter operatively connected to the pneumatic circuit and comprising an electronic control board to track operation of the pneumatic motor and to maintain a count of spindle cycles based on the operation of the pneumatic motor, the counter positioned along the pneumatic circuit downstream from the start switch and includes a separate inlet and outlet for air to move through the counter, the counter configured to control the air that moves through the counter from the start switch to the control valve to prevent activation of the pneumatic motor and prevent additional spindle cycles when the count reaches a predetermined number without interrupting the flow of air into the pneumatic circuit through the main air inlet.

11. The pneumatic tool of claim 10, wherein the counter receives a motor run signal indicating that the pneumatic motor is in operation and the spindle is moving along the feed path.

12. The pneumatic tool of claim 11, wherein the counter is configured to equate receipt of the motor run signal for a predetermined period to one of the spindle cycles.

13. The pneumatic tool of claim 10; wherein the counter is configured to emit a warning upon reaching a first predetermined number of spindle cycles.

14. The pneumatic tool of claim 13; wherein the counter is configured to disable operation of the pneumatic tool upon reaching a second higher predetermined number of spindle cycles.

* * * * *